(12) United States Patent
Liao

(10) Patent No.: US 6,695,267 B2
(45) Date of Patent: Feb. 24, 2004

(54) STANDING DEVICE FOR A SPRAY GUN

(76) Inventor: Hsing-Mei Liao, No. 8, Lane 21, Jung Hua Rd., Wu Jih Hsiang, Taichung Hsien (TW)

( * ) Notice: Subject to any disclaimer, the term of this patent is extended or adjusted under 35 U.S.C. 154(b) by 0 days.

(21) Appl. No.: 10/413,295

(22) Filed: Apr. 15, 2003

(65) Prior Publication Data

US 2003/0226946 A1 Dec. 11, 2003

Related U.S. Application Data

(63) Continuation-in-part of application No. 10/165,987, filed on Jun. 11, 2002.

(51) Int. Cl.[7] ............................................. A47G 23/02
(52) U.S. Cl. ................................... 248/175; 248/176.1
(58) Field of Search ............................. 248/316.7, 312, 248/313, 312.1, 311.2, 153, 154, 133, 134, 140, 142, 117.4, 346.03, 80, 82, 176.1, 176.2, 176.3, 175

(56) References Cited

U.S. PATENT DOCUMENTS

| | | | | |
|---|---|---|---|---|
| 1,508,535 A | * | 9/1924 | Rottenburg | 248/153 |
| 2,309,772 A | * | 2/1943 | Karger | 248/82 |
| 2,495,995 A | * | 1/1950 | Warrens et al. | 248/82 |
| 2,778,931 A | * | 1/1957 | Cruz | 240/52.5 |
| 2,925,235 A | * | 2/1960 | Jaros | 248/153 |
| 3,085,776 A | * | 4/1963 | Mycock et al. | 248/153 |
| 5,381,989 A | * | 1/1995 | Jackson | 248/231.51 |
| 5,613,305 A | * | 3/1997 | Narrin | 34/90 |
| 5,636,815 A | * | 6/1997 | Wilson | 248/125.9 |
| 5,832,624 A | * | 11/1998 | Narrin | 34/97 |
| 5,842,670 A | * | 12/1998 | Nigoghosian | 248/160 |
| 5,937,537 A | * | 8/1999 | Miller | 34/97 |
| D440,477 S | * | 4/2001 | Pappas | D8/71 |

\* cited by examiner

*Primary Examiner*—Korie Chan
*Assistant Examiner*—A. Joseph Wujciak, III
(74) *Attorney, Agent, or Firm*—Rosenberg, Klein & Lee

(57) ABSTRACT

A standing device for a spray gun includes a clamping device a clamping device adapted to clamp a neck portion of the spray gun and including a first block and a second block abutting each other to form a clamping space adapted to receive the neck portion of the spray gun. A support rack pivotally connected to the clamping device. The support rack is made of a wire material by integral bending such that the support rack providing an elasticity to make the first block and the second block abutting each other.

5 Claims, 9 Drawing Sheets

STANDING DEVICE FOR A SPRAY GUN

CROSS-REFERENCE TO RELATED APPLICATION

The application is a Continuation-In-Part of Ser. No. 10/165,987, filed Jun. 11, 2002, and entitled "STAND DEVICE FOR SPRAY GUN", now pending.

BACKGROUND OF THE INVENTION

1. Field of the Invention

The present invention relates to a standing device, and more particularly to stand device for a spray gun.

2. Description of Related Art

A standing device/tool holder is widely used for supporting hand tools or small domestic appliances when provisionally stop operate or in a continual use. As usual, the standing device/tool holder has a clamping device to clamp the hand tool or the small domestic appliance. As shown in FIG. 8, a conventional appliance holder is provided to hold a domestic appliance, such as a hair dryer. The conventional appliance holder comprises a base plate (41) adapted to be secured on a wall and having a protrusion (411) extending from the base plate (41). A hole (412) is longitudinally defined in the protrusion (411). A L-shaped connector (42) includes a vertical section (421) inserted into the hole (412) in the protrusion (411) and a horizontal section having a spheroid (422) formed on a free end of the horizontal section. A first clamping block (43) and a second clamping block (44) respectively clamp the spheroid (422). The first clamping block (43) includes a first end having a first socket (431) defined to partially receive the spheroid (422) and a second end having a first clamping arm (432) extending from the first clamping block (43). A first through hole (433) is defined between in the first clamping block (43) between the first socket (431) and the first clamping arm (432). The second clamping block (44) includes a first end having a second socket (441) defined to partially receive the spheroid (422) and a second end having a second clamping arm (442) extending from the second clamping block (44). The second clamping aim (442) and the first clamping arm (432) correspond to each other to form a clamping space for receiving a neck portion of the appliance. A second through hole (443) is defined in the second clamping block (44) between the second socket (441) and the second clamping arm (442). The second through hole (443) and the first through hole (433) align with each other. A bolt (45) extends through the second through hole (443) and the first through hole (433), and a nut (46) is screwed onto the bolt (45) after the bolt (45) extending through the second through hole (443) and the first through hole (433) to make the first clamping block (43) and the second clamping bock (44) securely clamping the spheroid (422). Consequently, the first clamping block (43) and the second clamping block (44) with the appliance are positioned on the spheroid (422).

As described above, the clamp force among the first clamping block (43), the second clamping block (44) and the spheroid (422) is provided by the bolt (45) and the nut (46). Consequently, the appliance will hang down due to the gravity of the appliance when the bolt (45) and the nut (46) are slightly loosed during using. Furthermore, the appliance is positioned in somewhere by using the standing device/tool holder that cannot be widely used.

Another conventional standing device is provided for a spray gun. With reference to FIG. 9, the conventional standing device comprises a seat body (52) locked at a bottom end of a handle (51) of the spray gun (5). The seat body (52) is pivotally connected with a support rack (53). The support rack (53) is leant on a leaning rod (54) of the seat body (52). After the support rack (53) being pivoted to lean on the leaning rod (54), the support rack (53) can support the spray gun (5) on a plane face in a standing state.

However, the seat body (52) is locked at the bottom end of the handle (51). The support rack (53) has a considerable volume and cannot be folded and located. In use the spray gun (5), the support rack (53) will obstruct a user from operating the spray gun (5). Moreover, the support rack (53) may occupy much room when storing the spray gun (5).

Even though to combined the two conventional standing devices, the disadvantage of a hanging tool due to a weakened clamping still have not been solved.

The present invention has arisen to mitigate and/or obviate the disadvantages of the conventional standing device for a spray gun.

SUMMARY OF THE INVENTION

The main objective of the present invention is to provide an improved standing device for a spray gun. The standing device of the present invention has a wide using scope.

To achieve the objective, the standing device for a spray gun in accordance with the present invention comprises a clamping device a clamping device adapted to clamp a neck portion of the spray gun and including a first block and a second block abutting each other to form a clamping space adapted to receive the neck portion of the spray gun. A support rack pivotally connected to the clamping device. The support rack is made of a wire material by integral bending such that the support rack providing an elasticity to make the first block and the second block abutting each other.

Further benefits and advantages of the present invention will become apparent after a careful reading of the detailed description with appropriate reference to the accompanying drawings.

DETAILED DESCRIPTION OF THE INVENTION

Figure 1:
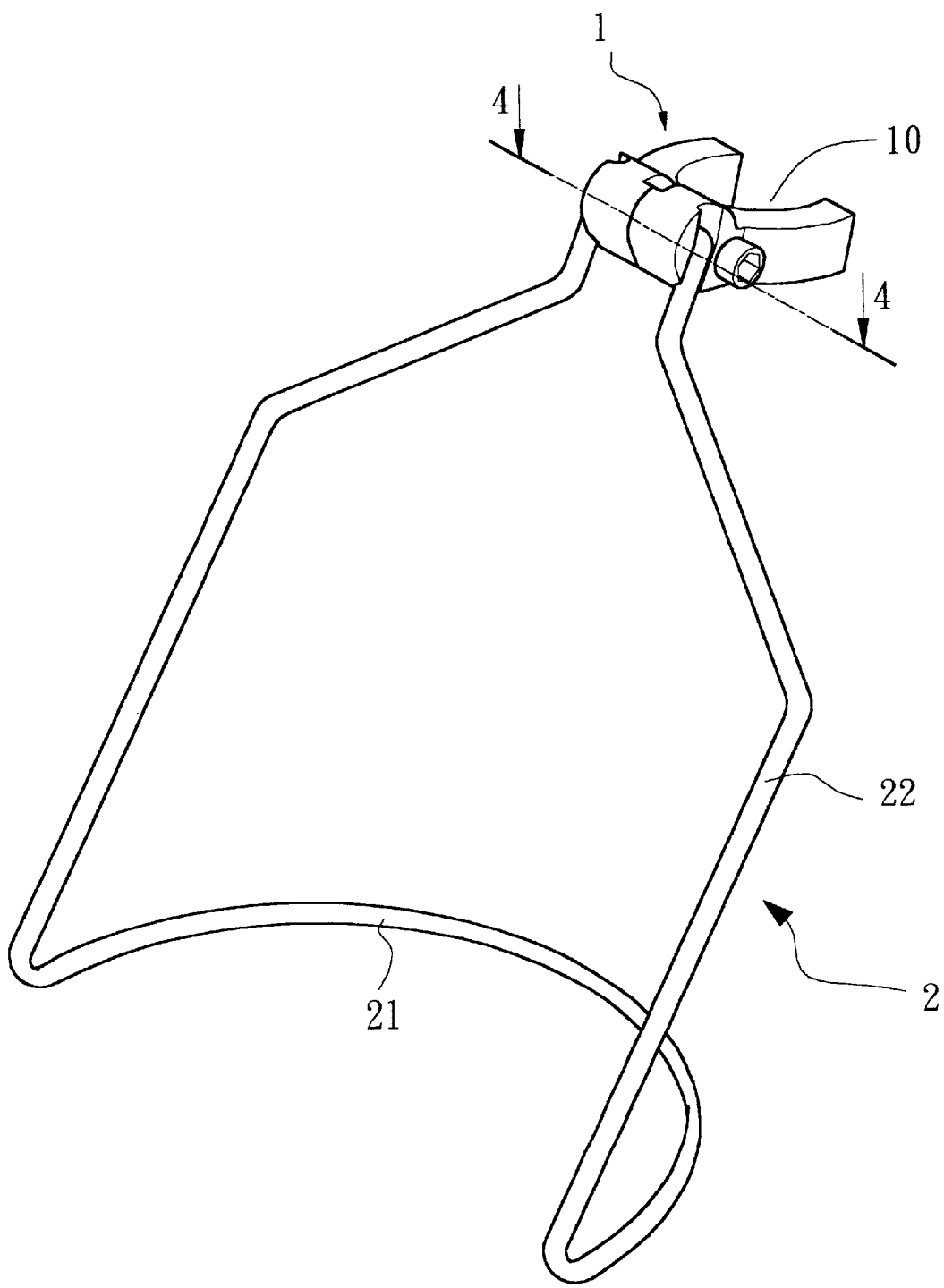
FIG. 1 is a perspective view of a standing device for a spray gun in accordance with the present invention.
Figure 2:
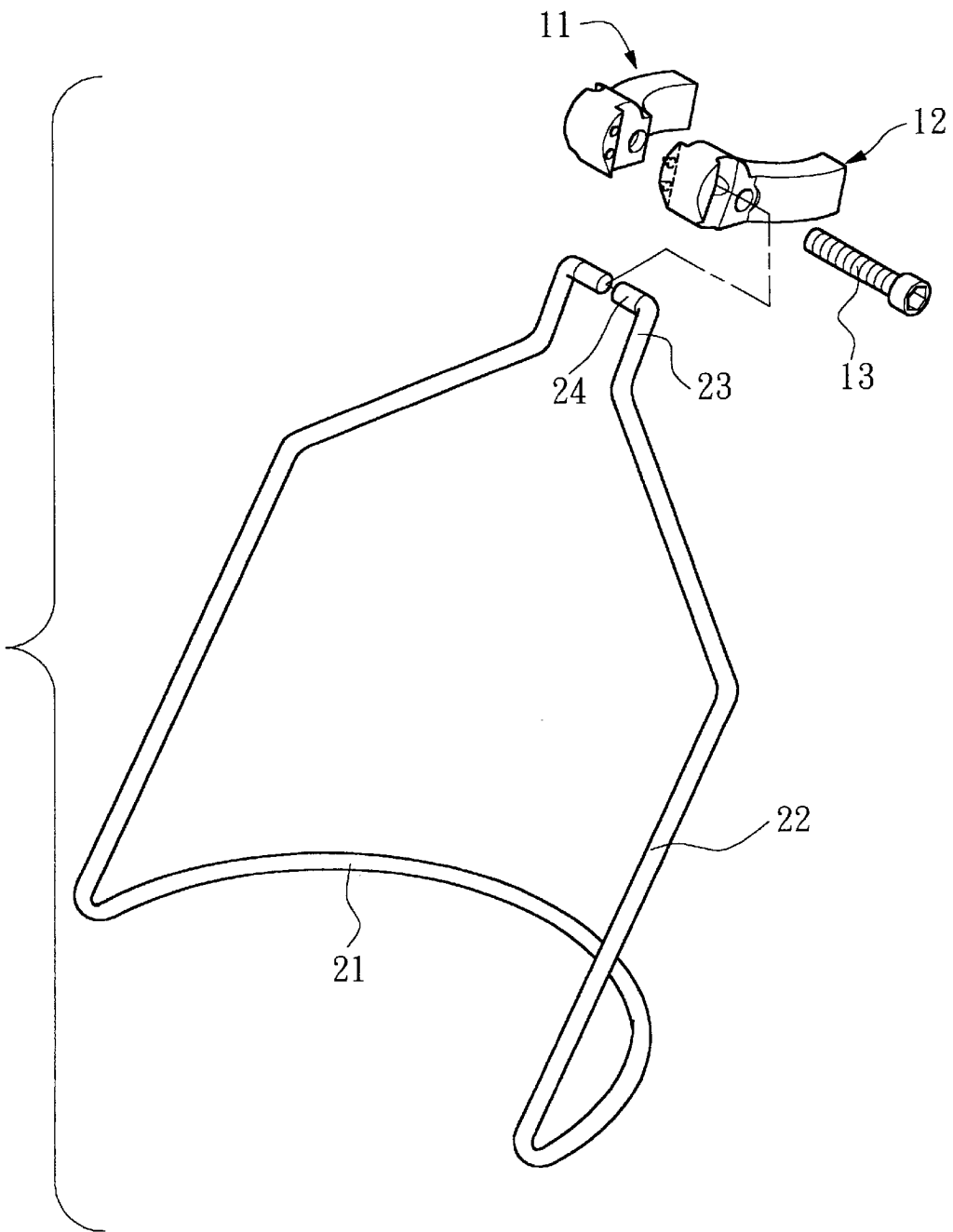
FIG. 2 is an exploded perspective view of the standing device for a spray gun in FIG. 1.
Figure 3:
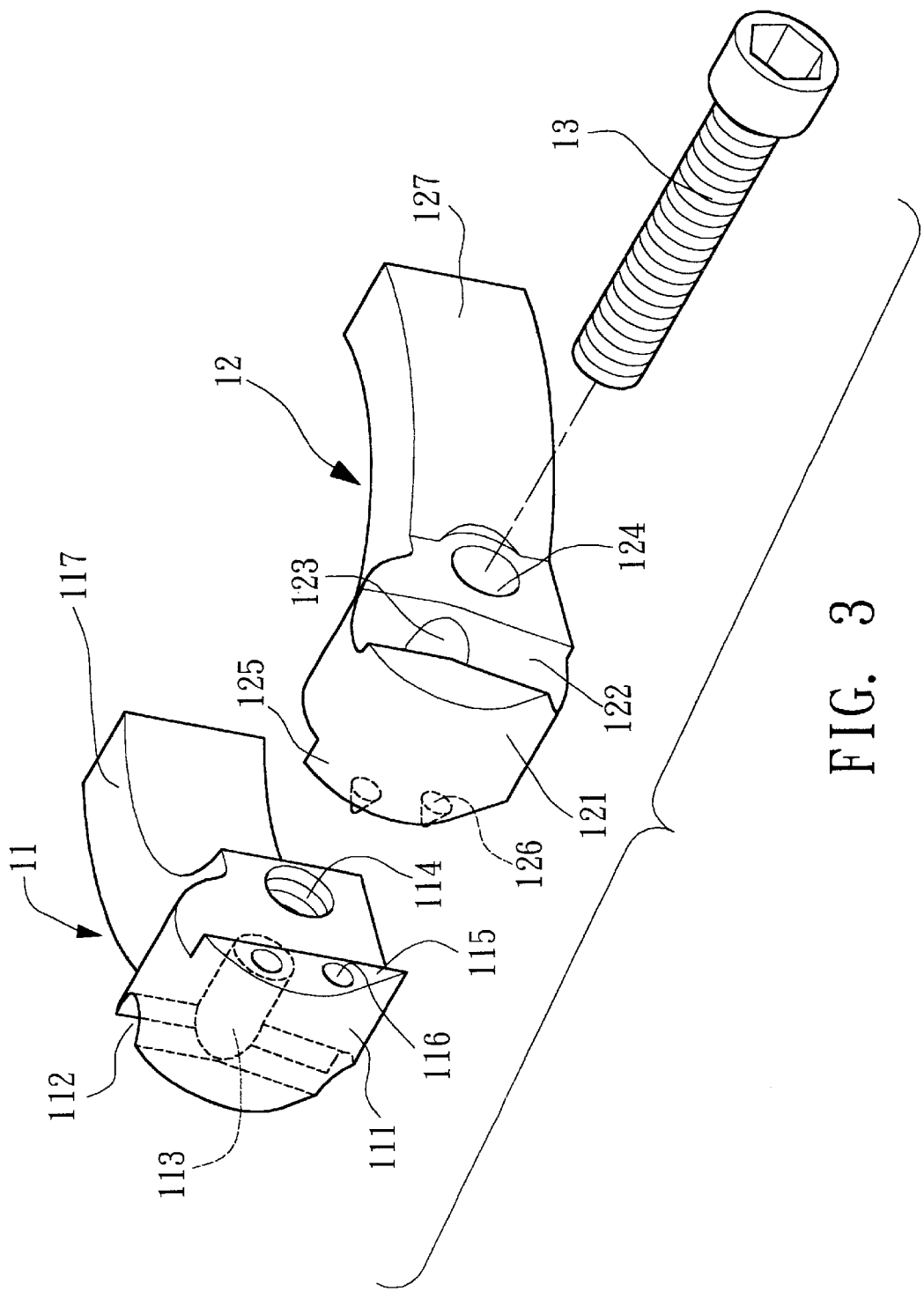
FIG. 3 is a perspective view of a clamping device of the standing device in FIG. 2.

Referring to the drawings and initially to FIGS. 1–3, a standing device for a spray gun in accordance with the present invention comprises a clamping device (1) adapted to clamp a neck portion of the spray gun and a support rack (2) pivotally connected to the clamping device (1).

The clamping device (1) comprises a first block (11) and a second block (12) abutting each other to form a clamping space (10) for fixedly receiving the neck portion of the spray gun. The first block (11) includes a first body (111) having a first side and a second side opposite to the first side of the first body (111). A first groove (112) is defined in the first side of the first body (111), and a first hole (113) is laterally defined in the first body (111) and communicates with the first groove (112). The first hole (113) divides the first groove (112) into a lower portion and an upper portion. A threaded hole (114) is laterally defined in the first body (111) and extends through the first body (111). A first protrusion (115) laterally extends from a first end of the first body (111) toward the second block (12). At least one bore (116) is laterally defined in the protrusion (115). A first clamping arm (117) extends from a second end of the first body (111) adjacent to the first side of the first body (111).

Figure 4:
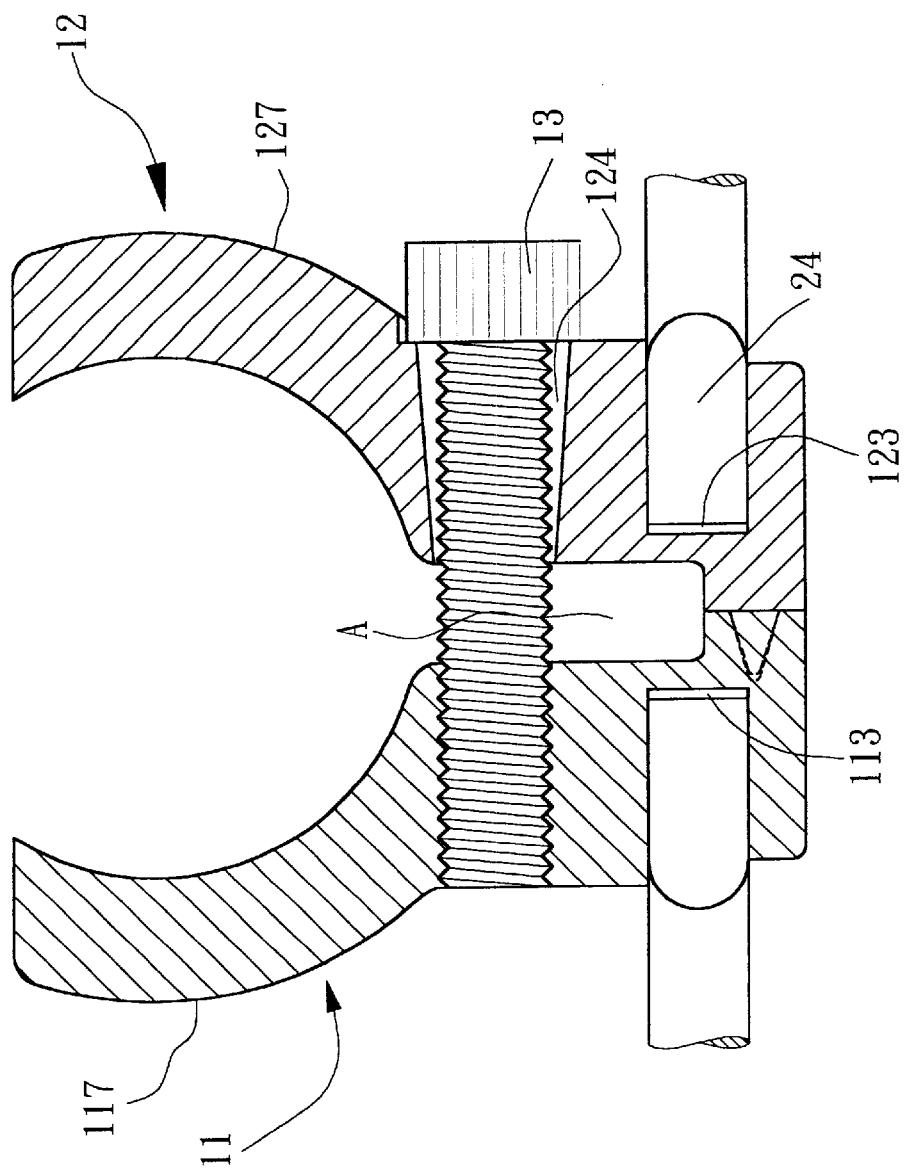
FIG. 4 is a top cross-sectional view of the clamping device in FIG. 1.

The second block (12) includes a second body (121) corresponding to the first body (111). The second body (121) has a first side and a second side opposite to the first side of the second body (121) and facing the second side of the first body (111). The second body (121) includes a second groove (122) defined in the first side of the second body (121) and corresponding to the first groove (112) in the first body (111). A second hole (123) is laterally defined in the first side of the second body (121) and co-axially aligns with the first hole (113) in the first body (111). The second hole (123) divides the second groove (122) into a lower portion and an upper portion. A through hole (124) is laterally defined in the second body (121) and co-axially aligns with the threaded hole (114) in the first body (111). Further with reference to FIG. 4, the through hole (124) is tapered and has a diameter gradually reduced relative to the first block (11). A second protrusion (125) laterally extends from a first end of the second body (121) and corresponds to the first protrusion (115) of the first body (111) such that a gap (A) is formed between the second sides of the first body (111) and the second body (121). At least one stub (126) laterally extends from the second protrusion (125) and co-axially corresponds to the at least one bore (116) in the first protrusion (115) of the first body (111). The at least one stub (126) is received in the at least one bore (116) and used as a guider when mounting the first block (11) and the second block (12) to each other. The at least one stub (116) is cone-shaped. A second clamping arm (127) extends from a second end of the second body (121) and corresponds to the first clamping arm (117) of the first block (11) such that the clamping space (10) is formed between the first clamping arm (117) and the second clamping arm (127). The clamping device (1) further comprises a bolt (13) extending through the through hole (124) in the second body (121) and screwed into the threaded hole (114) in the first body (111) to adjust the width of the gap (A) between the two second sides of the first body (111) and the second body (112). The bolt (13) can be slightly moved in the through hole (124) in the second body (121) when adjusting the width of the gap (A) because the though hole (124) is tapered.

The support rack (2) is made of a wire material by integral bending such that the support rack (2) provides an elasticity to make the first block (11) and the second block (12) abutting each other and clamping the neck portion of the spray gun. The support rack (2) includes a leaning section (21) abutting a supporting surface when the spray gun is in a standing state. The leaning section (21) includes two opposite ends each having a support rod (22) obliquely upwardly extending toward the clamping device (1). Each support rod (22) has a vertical section (23) partially received in a corresponding one of the first groove (112) and the second groove (122). Each vertical section (23) includes a free end having a shaft section (24) laterally extending from each of the vertical sections (23). Each shaft section (24) is pivotally received in a corresponding one of the first hole (113) and the second hole (123) for pivotally mounting the support rack (2) to the clamping device (1).

Figure 5:
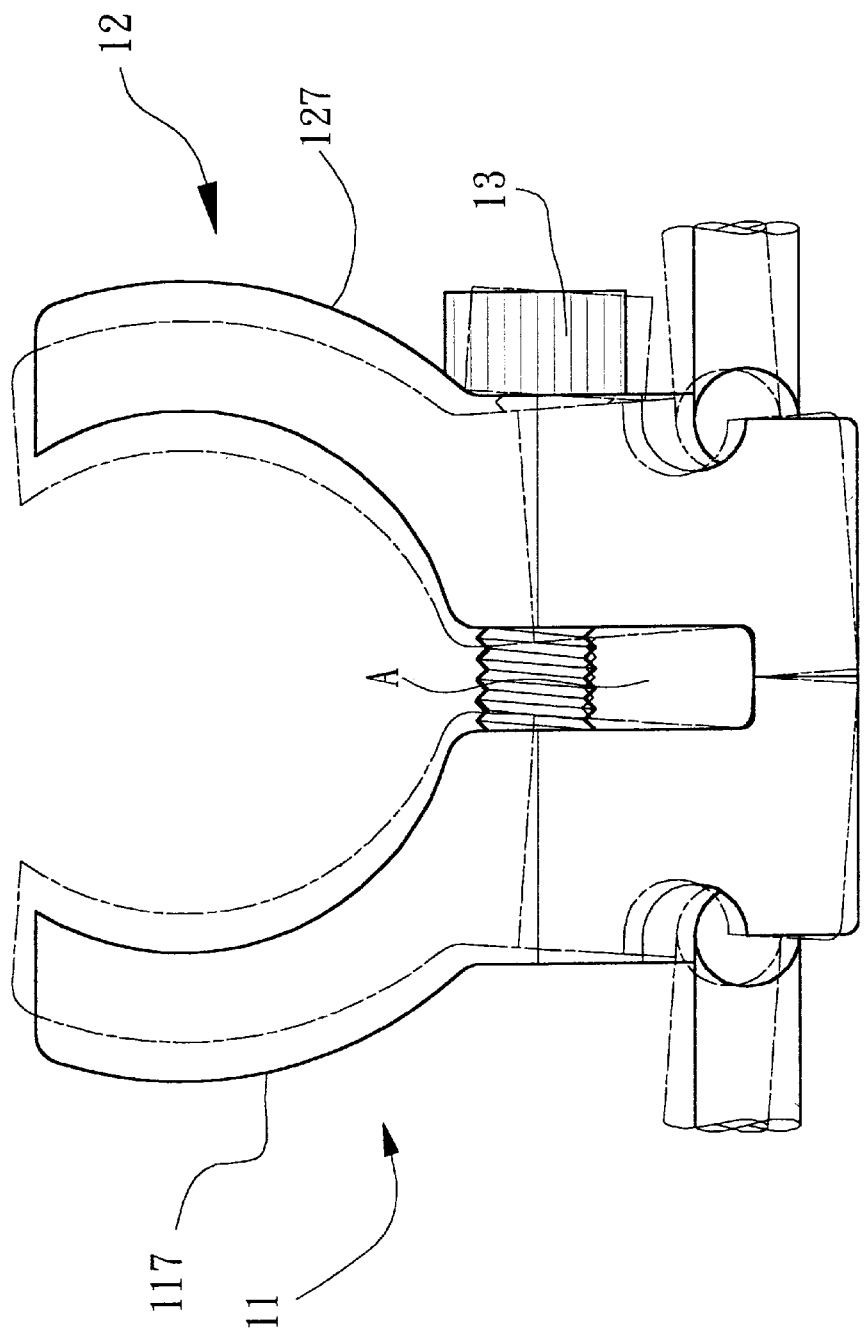
FIG. 5 is an operational top plan view of the clamping device in FIG. 4.
Figure 6:
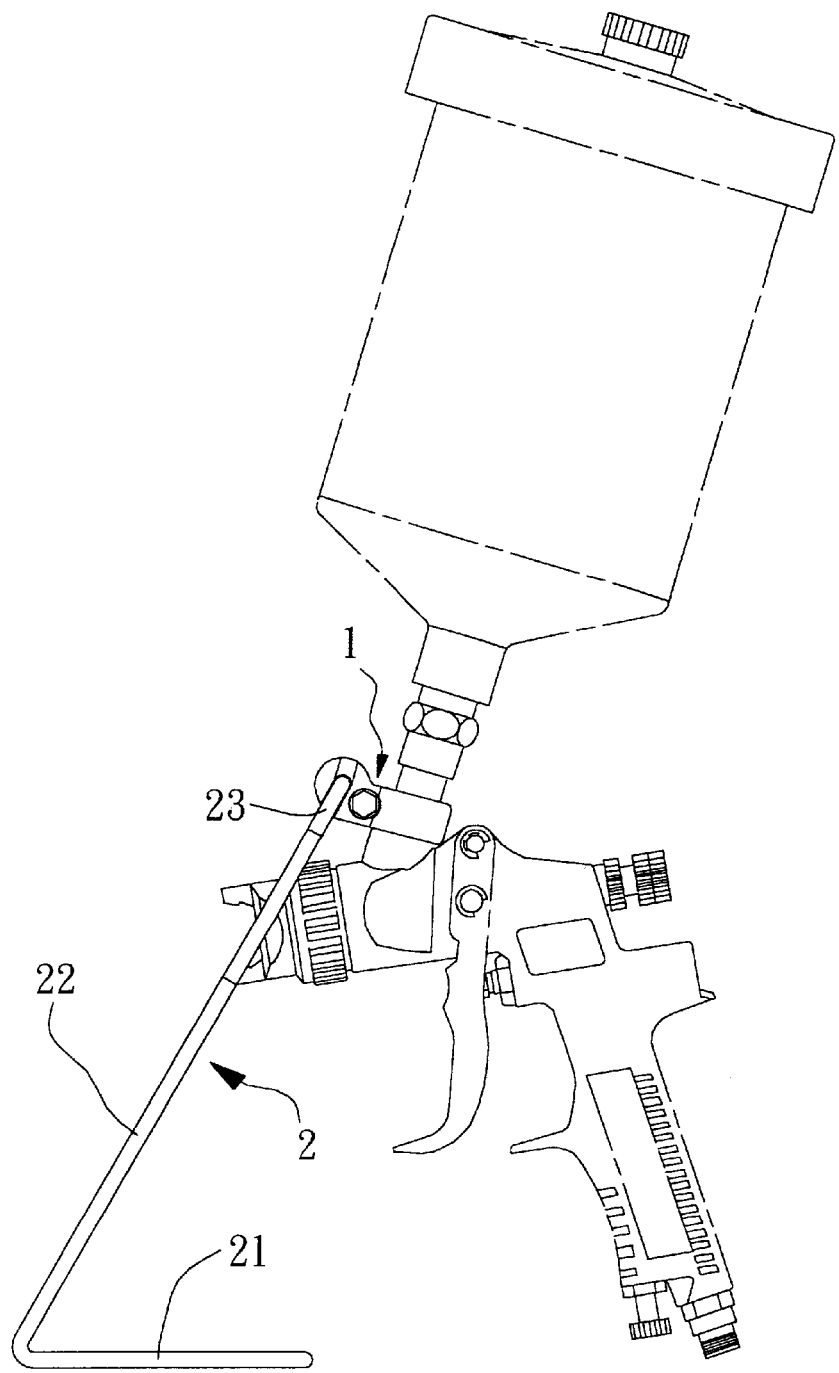
FIG. 6 is a schematic side plan view of the standing device in FIG. 1 when the spray gun is in a standing state.

With reference to FIGS. 5 and 6, the clamping space (10) receives the neck portion of the spray gun, and the first clamping arm (117) and the second clamping arm (127) clamp the periphery of the neck portion of the spray gun. The bolt (13) extends through the through hole (124) and is screwed into the threaded hole (114) to shorten the width of the gap (A) between the second sides of the first body (111) and the second body (121) to make the clamping device (1) securely clamping the neck portion of the spray gun. The vertical sections (23) of the support rack (2) are respectively partially received in a lower portion of a corresponding one of the first groove (112) and the second groove (122). Then, the two opposite ends of the leaning section and a handle of the spray gun are connected to form a plane such that the spray gun is in a standing state.

Figure 7:
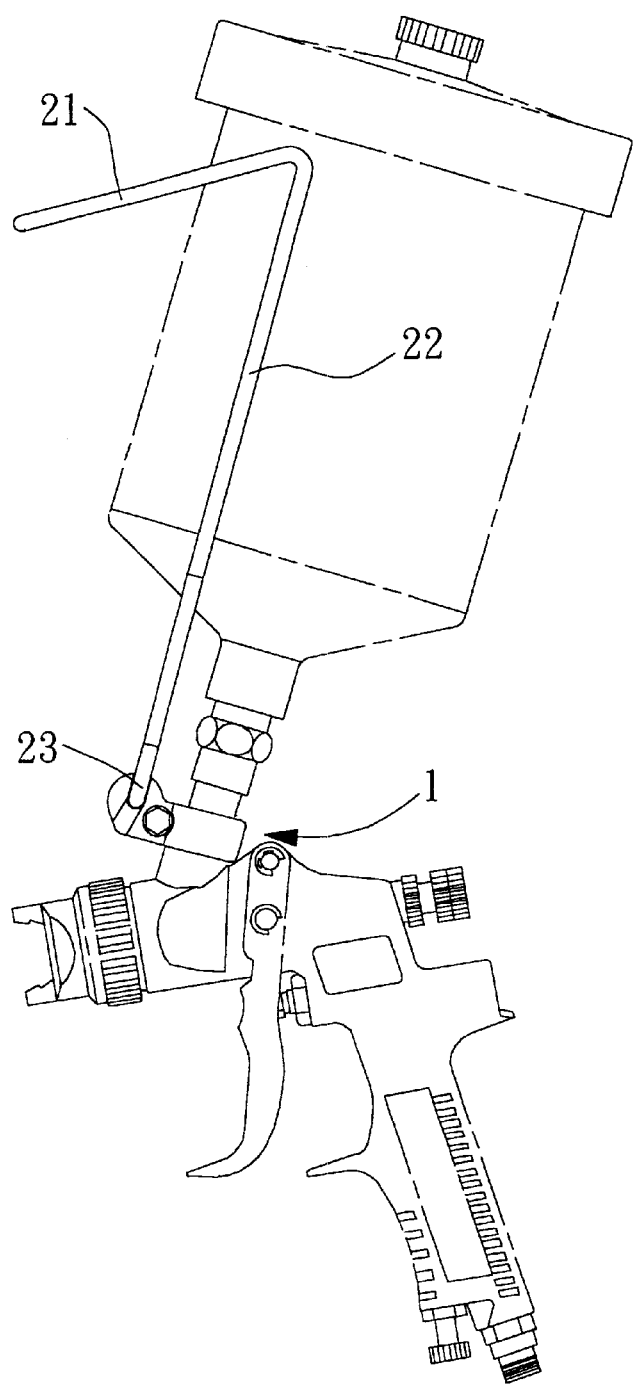
FIG. 7 is a schematic side plan view of the standing device in FIG. 1 when the spray gun is in a operating state.
Figure 8:
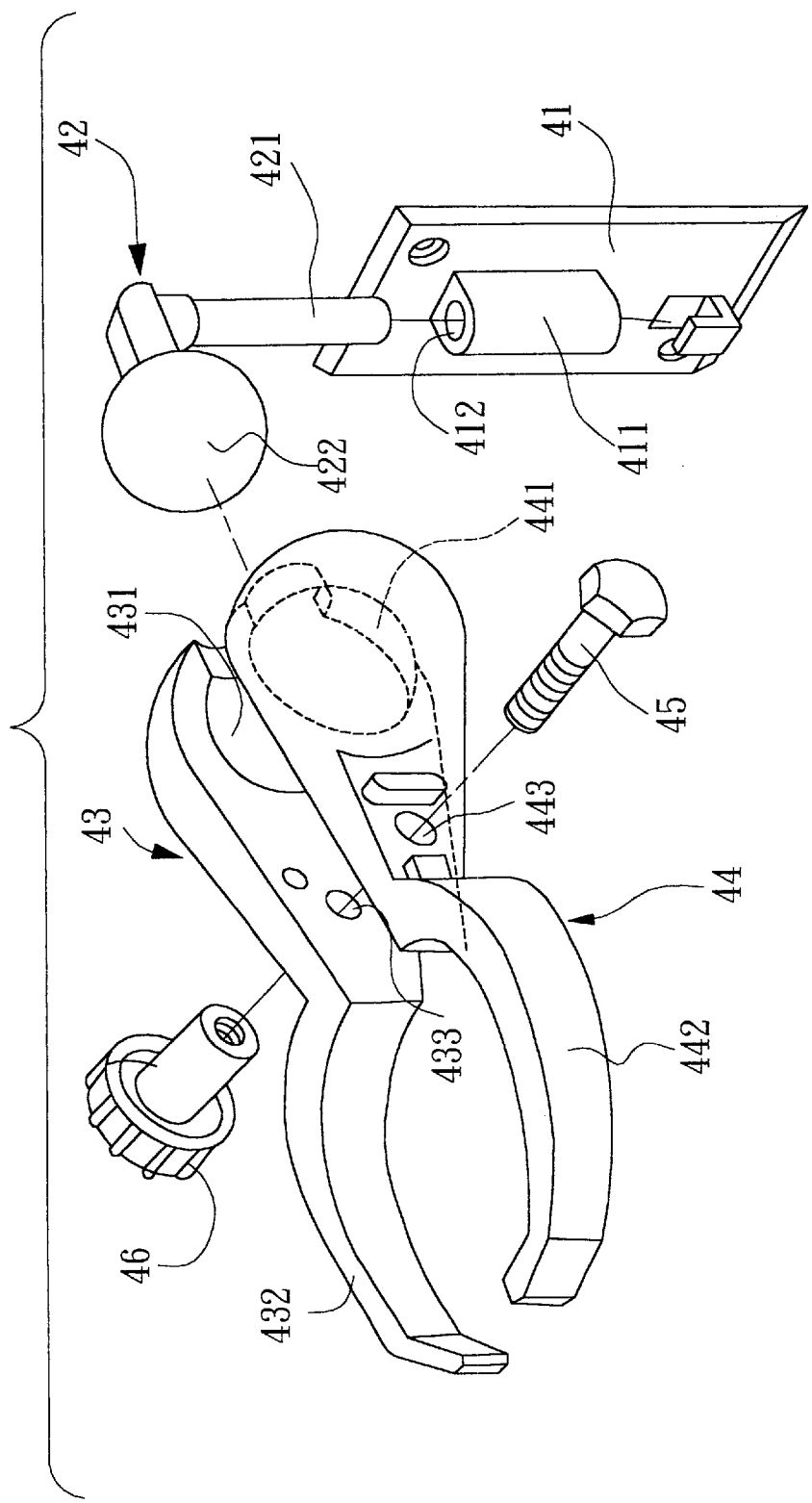
FIG. 8 is a perspective exploded view of a conventional tool holder in accordance with the prior art.
Figure 9:
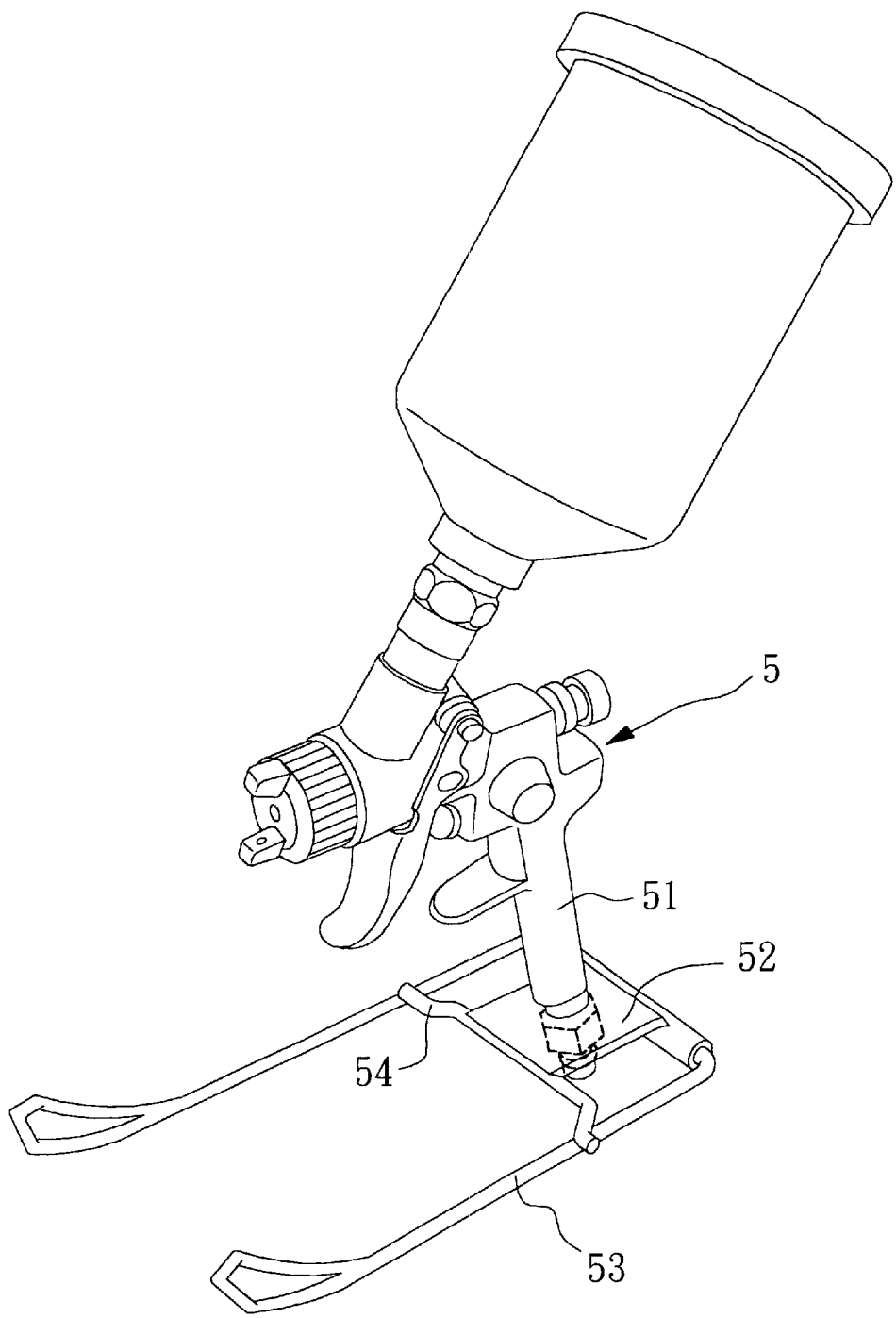
FIG. 9 is a perspective view of a conventional standing device for a spray gun in accordance with the prior art when the spray gun is in a standing state.

With reference to FIG. 7, when operating the spray gun, the support rack (2) is upwardly wrenched to make the vertical sections (23) partially received in the upper portion of a corresponding one of the first groove (112) and the second groove (122). Further with reference to FIG. 2, the leaning section (21) has a shape corresponding to that of a feeder of the spray gun.

As described above, the standing device for a spray gun in accordance with the present invention has several advantages as follow.

1. The total volume of the standing device of the present invention and the spray gun is reduced when the spray gun is in an operating state because the leaning section (21) of the support rack (2) has a shape corresponding to that of a feeder of the spray gun.

2. The first block (11) and the second block (12) is easily to be mounted to each other because the stub (126) of the second block (12) corresponds to and received in the bore (116) in the first block (11) as a guider.

3. The gap (A) between the two second sides of the first body (111) and the second body (121) can be shortened by the bolt (13) such that the distance between the two clamping arms (117, 127) can be shortened to clamp a narrower neck portion of another spray gun relative to the original spray gun. Consequently, the using scope of standing device of the present invention is wide.

Although the invention has been explained in relation to its preferred embodiment, it is to be understood that many other possible modifications and variations can be made without departing from the spirit and scope of the invention as hereinafter claimed.

What is claimed is:

1. A standing device for a spray gun, comprising:
    a clamping device adapted to clamp a neck portion of the spray gun and including a first block and a second block abutting each other to form a clamping space adapted to receive the neck portion of the spray gun, wherein:
        the first block includes:
            a first body having a first side and a second side opposite to the first side;
            a first hole laterally defined in the first side of the first body;

a threaded hole laterally defined in and extending through the first body;

a first protrusion laterally extending from a first end of the body toward the second block; and a clamping arm extending from a second end of the first body adjacent the first side of the first body; and the second block includes:

a second body abutting the first body, the second body having a first side and a second side facing the second side of the first body;

a second hole laterally defined in the first side of the second body and co-axially aligning with the first hole in the first body;

a through hole defined in and extending through the second body, the through hole co-axially aligning with the threaded hole;

a second protrusion laterally extending from a first end of the second body and abutting the first protrusion such that a gap is formed between the two second sides of the first body and the second body; and a second clamping arm extending from a second end of the second body adjacent the first side of the second body such that the clamping space is formed between the first clamping arm and the second clamping arm; and a support rack pivotally connected to the clamping device and including:

a leaning section abutting a supporting surface when the spray gun is in a standing state;

two support rods respectively upwardly extending from a corresponding one of two opposite ends of the leaning section; and two shaft sections respectively laterally extending from a free end of each of the two support rods, the two shaft sections directing to each other and respectively pivotally received in a corresponding one of the first hole and the second hole, the support rack being made of a wire material by integral bending such that the support rack providing an elasticity to make the first block and the second block abutting each other; and a bolt extending through the through hole and screwed into the threaded hole to adjust the gap between the second sides of the first body and the second body.

2. The standing device as claimed in claim 1, wherein:

the first block includes a first groove defined in the first side of the first block and communicating with the first hole, the first hole dividing the first groove into a lower portion and an upper portion;

the second block includes a second groove defined in the first side of the second block and communicating with the second hole, the second groove corresponding to the first groove and the second hole dividing the second groove into a lower portion and an upper portion; and the two support rods each having a vertical section partially received in a corresponding one of the first groove and the second groove, the vertical sections respectively partially received in the two lower portions of the first groove and the second groove when the spray gun is in a standing state and in the two upper portions of the first groove and the second groove when the spray gun is in an operating state.

3. The standing device as claimed in claim 2, wherein:

the first body includes at least one bore laterally defined in the first protrusion; and the second body includes at least one stub laterally extending from the second protrusion and co-axially corresponding to the at least one bore, the at least one stub received in the at least bore and used a guider when mounting the first block and the second block to each other.

4. The standing device as claimed in claim 1, wherein the through hole in the second body is tapered and has a diameter gradually reducing relative to the first block such that the bolt can be slightly moved in the through hole when adjusting the gap between the two second sides of the first body and the second body.

5. The standing device as claimed in claim 1, wherein:

the first body includes at least one bore laterally defined in the first protrusion; and the second body includes at least one stub laterally extending from the second protrusion and co-axially corresponding to the at least one bore, the at least one stub received in the at least bore and used a guider when mounting the first block and the second block to each other.

\* \* \* \* \*